16

(12) United States Patent
Yamaguchi (10) Patent No.: US 9,019,563 B2
(45) Date of Patent: Apr. 28, 2015

(54) HALFTONE IMAGE GENERATION DEVICE THAT GENERATES A BLENDED HALFTONE IMAGE OF AN IMAGE BY PARTIALLY SELECTING AND BLENDING A FIRST HALFTONE IMAGE OBTAINED BY HALFTONE PROCESSING THE SPECIFIC IMAGE USING A FIRST METHOD AND A SECOND HALFTONE IMAGE OBTAINED BY HALFTONE PROCESSING THE SPECIFIC IMAGE USING A SECOND METHOD, ASSOCIATED HALFTONE IMAGE GENERATION METHOD, AND COMPUTER-READABLE STORAGE MEDIUM FOR COMPUTER PROGRAM

(75) Inventor: Tomohiro Yamaguchi, Shinshiro (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 748 days.

(21) Appl. No.: 13/048,446

(22) Filed: Mar. 15, 2011

(65) Prior Publication Data

US 2011/0235127 A1 Sep. 29, 2011

(30) Foreign Application Priority Data

Mar. 23, 2010 (JP) ................................. 2010-066878

(51) Int. Cl.
*G06K 15/00* (2006.01)
*H04N 1/405* (2006.01)
*G06K 9/00* (2006.01)

(52) U.S. Cl.
CPC ........... *H04N 1/4051* (2013.01); *H04N 1/4052* (2013.01)

(58) Field of Classification Search
None
See application file for complete search history.

(56) References Cited

U.S. PATENT DOCUMENTS

| 5,268,774 | A * | 12/1993 | Eschbach ...................... 358/466 |
| 5,805,734 | A * | 9/1998 | Ebner ........................... 382/237 |
| 6,118,935 | A * | 9/2000 | Samworth ..................... 358/1.9 |
| 6,519,367 | B2 * | 2/2003 | Nagarajan et al. ............ 382/252 |
| 2005/0030586 | A1 * | 2/2005 | Huang et al. .................. 358/2.1 |

FOREIGN PATENT DOCUMENTS

| JP | 63-288565 A | 11/1988 |
| JP | 11-355577 A | 12/1999 |
| JP | 2000-196875 A | 7/2000 |

(Continued)

OTHER PUBLICATIONS

Office Action (Notification of Reason(s) for Refusal) dated Jan. 17, 2012, issued in the corresponding Japanese Patent Application No. 2010-066878, and an English Translation thereof. (5 pages).

*Primary Examiner* — Steven Kau
(74) *Attorney, Agent, or Firm* — Buchanan Ingersoll & Rooney PC (57) ABSTRACT

A halftone image generation device is provided that, by partially selecting and blending a first halftone image obtained by halftone processing a specific image using a first method and a second halftone image obtained by halftone processing the specific image using a second method different from the first method, generates a third halftone image of the specific image. The device includes a detector detecting, from the first halftone image, a dot pixel in which a dot is disposed, and a blender blending the first halftone image and the second halftone image by, when a dot is not disposed in any of neighboring pixels in the first halftone image that neighbor the dot pixel, employing, as binary values of isolated-point related pixels in the third halftone image that are in a same position as the dot pixel and the neighboring pixels, binary values of the dot pixel and the neighboring pixels.

12 Claims, 11 Drawing Sheets

(56) References Cited

FOREIGN PATENT DOCUMENTS

| | | |
|---|---|---|
| JP | 2003-274173 A | 9/2003 |
| JP | 2004-112356 A | 4/2004 |
| JP | 2004-179768 A | 6/2004 |
| JP | 2008-087382 A | 4/2008 |

* cited by examiner

| P(X-2, Y-2) | P(X-1, Y-2) | P(X, Y-2) | P(X+1, Y-2) | P(X+2, Y-2) |
|---|---|---|---|---|
| P(X-2, Y-1) | P(X-1, Y-1) | P(X, Y-1) | P(X+1, Y-1) | P(X+2, Y-1) |
| P(X-2, Y) | P(X-1, Y) | P(X, Y) | P(X+1, Y) | P(X+2, Y) |
| P(X-2, Y+1) | P(X-1, Y+1) | P(X, Y+1) | P(X+1, Y+1) | P(X+2, Y+1) |
| P(X-2, Y+2) | P(X-1, Y+2) | P(X, Y+2) | P(X+1, Y+2) | P(X+2, Y+2) |

☒ : DOT PIXEL OF ERROR-DIFFUSED IMAGE
■ : DOT PIXEL OF SCREEN-PROCESSED IMAGE

FIG. 9

| | | | | | |
|---|---|---|---|---|---|
| 0 | 0 | 0 | 0 | 0 | 0 |
| 0 | 1 | 1 | 0 | 0 | 0 |
| 0 | 0 | 0 | 0 | 1 | 0 |
| 0 | 0 | 0 | 0 | 0 | 0 |
| 0 | 0 | 1 | 0 | 0 | 0 |
| 0 | 0 | 0 | 0 | 0 | 0 |

FIG. 10

▨ : DOT PIXEL OF ERROR-DIFFUSED IMAGE
■ : DOT PIXEL OF SCREEN-PROCESSED IMAGE

PRIOR ART

HALFTONE IMAGE GENERATION DEVICE THAT GENERATES A BLENDED HALFTONE IMAGE OF AN IMAGE BY PARTIALLY SELECTING AND BLENDING A FIRST HALFTONE IMAGE OBTAINED BY HALFTONE PROCESSING THE SPECIFIC IMAGE USING A FIRST METHOD AND A SECOND HALFTONE IMAGE OBTAINED BY HALFTONE PROCESSING THE SPECIFIC IMAGE USING A SECOND METHOD, ASSOCIATED HALFTONE IMAGE GENERATION METHOD, AND COMPUTER-READABLE STORAGE MEDIUM FOR COMPUTER PROGRAM

This application is based on Japanese patent application No. 2010-066878 filed on Mar. 23, 2010, the contents of which are hereby incorporated by reference.

BACKGROUND OF THE INVENTION

1. Field of the Invention

The present invention relates to a device and a method for selectively blending two images processed with two different methods.

2. Description of the Related Art

Error diffusion processing, screen processing and the like have been proposed as processing for performing halftone conversion (dithering) on an image.

Reproducing images with error diffusion processing results in greater sharpness than when images are reproduced with screen processing, although graininess increases.

In view of this, Japanese Laid-open Patent Publication No. 2003-274173 proposes a method for making images reproduced with error diffusion processing smoother than has been possible to date.

Also, Japanese Laid-open Patent Publication No. 2004-179768 proposes a method for selectively using error diffusion processing and screen processing according to an image processing mode. According to the method disclosed in Japanese Laid-open Patent Publication No. 2004-179768, output resulting from error diffusion processing is selected as a default if the image processing mode is "text/photo blend mode" or "text mode". Output resulting from screen processing of 141 lpi halftone dots is selected as a default if in "photo mode" (para 0012 to 0014).

Figure 10:
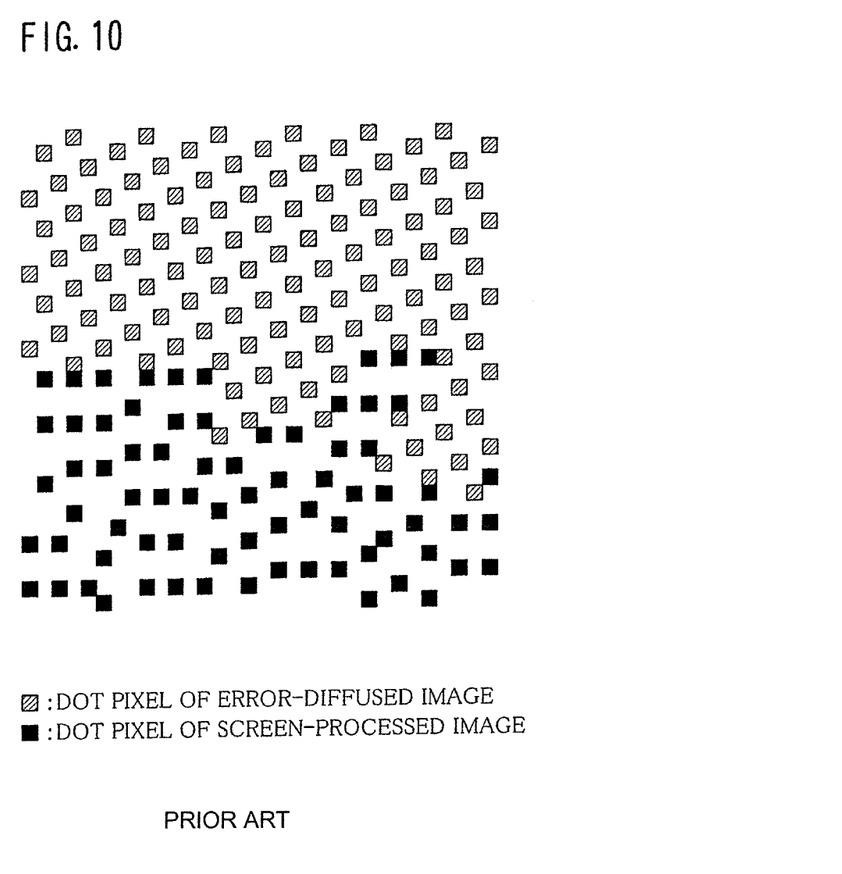
FIG. 10 shows an example of an unnatural connection between dots.

FIG. 10 shows an example of an unnatural connection between dots.

However, it may be desired to divide a single image into a plurality of regions, and reproduce some of the regions by error diffusion processing and reproduce the remaining regions by screen processing. In such a case, an unnatural connection between dots such as shown in FIG. 10 may appear near the boundary between an error-diffused region and a screen-processed region. Such an unnatural connection between dots produces image unevenness at the boundary portion, and is a cause of image degradation.

SUMMARY

The present invention has been made in consideration of such problems, and has as its object to reduce any unnatural connection between dots near the boundary between two regions processed with two different methods.

According to an aspect of the present invention, a halftone image generation device that, by partially selecting and blending a first halftone image obtained by halftone processing a specific image using a first method and a second halftone image obtained by halftone processing the specific image using a second method that differs from the first method, generates a third halftone image of the specific image, includes a detector that detects, from the first halftone image, a dot pixel in which a dot is disposed, and a blender that blends the first halftone image and the second halftone image by, in a case where a dot is not disposed in any of neighboring pixels in the first halftone image that neighbor the dot pixel, employing, as binary values of isolated-point related pixels in the third halftone image that are in a same position as the dot pixel and the neighboring pixels, binary values of the dot pixel and the neighboring pixels.

Preferably, the halftone image generation device may include a calculator that calculates a density of a prescribed range centered on each of the dot pixel and the neighboring pixels. The blender may blend the first halftone image and the second halftone image by, in a case where a dot is disposed in any of the neighboring pixels of the dot pixel in the first halftone image, employing, as binary values of highlight related pixels corresponding to a position of highlight pixels, which are pixels among the dot pixel and the neighboring pixels whose density of the prescribed range is less than a prescribed value, binary values of the highlight pixels.

Further, the blender may blend the first halftone image and the second halftone image by employing, as binary values of pixels in the third halftone image that are not one of the isolated-point related pixels or one of the highlight related pixels, binary values of pixels in the second halftone image that are in a same position as said pixels.

For example, the first method is a method using error diffusion processing, and the second method is a method using screen processing.

These and other characteristics and objects of the present invention will become more apparent by the following descriptions of preferred embodiments with reference to drawings.

DESCRIPTION OF THE PREFERRED EMBODIMENTS

Figure 1:
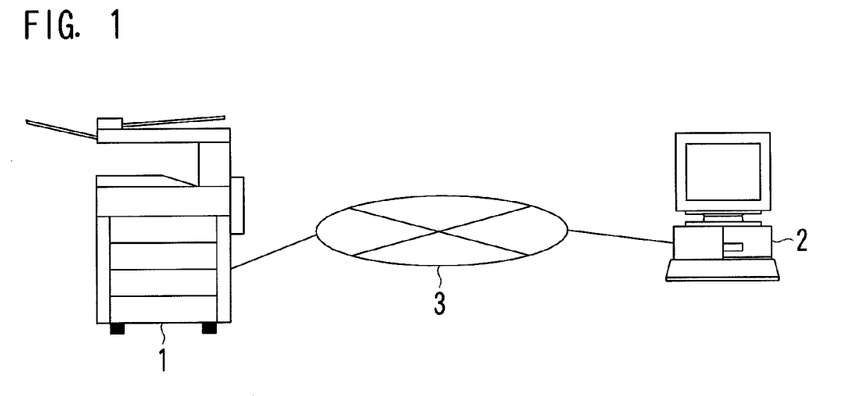
FIG. 1 shows an example configuration of a network system having an image forming device.
Figure 2:
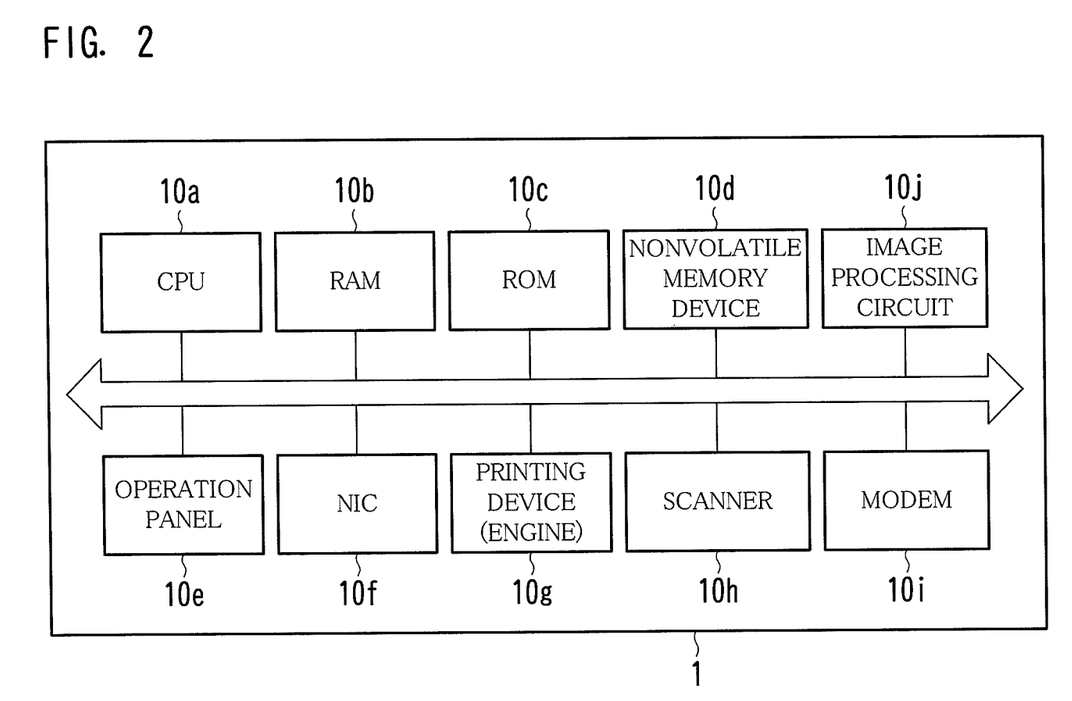
FIG. 2 shows an example hardware configuration of the image forming device.
Figure 3:
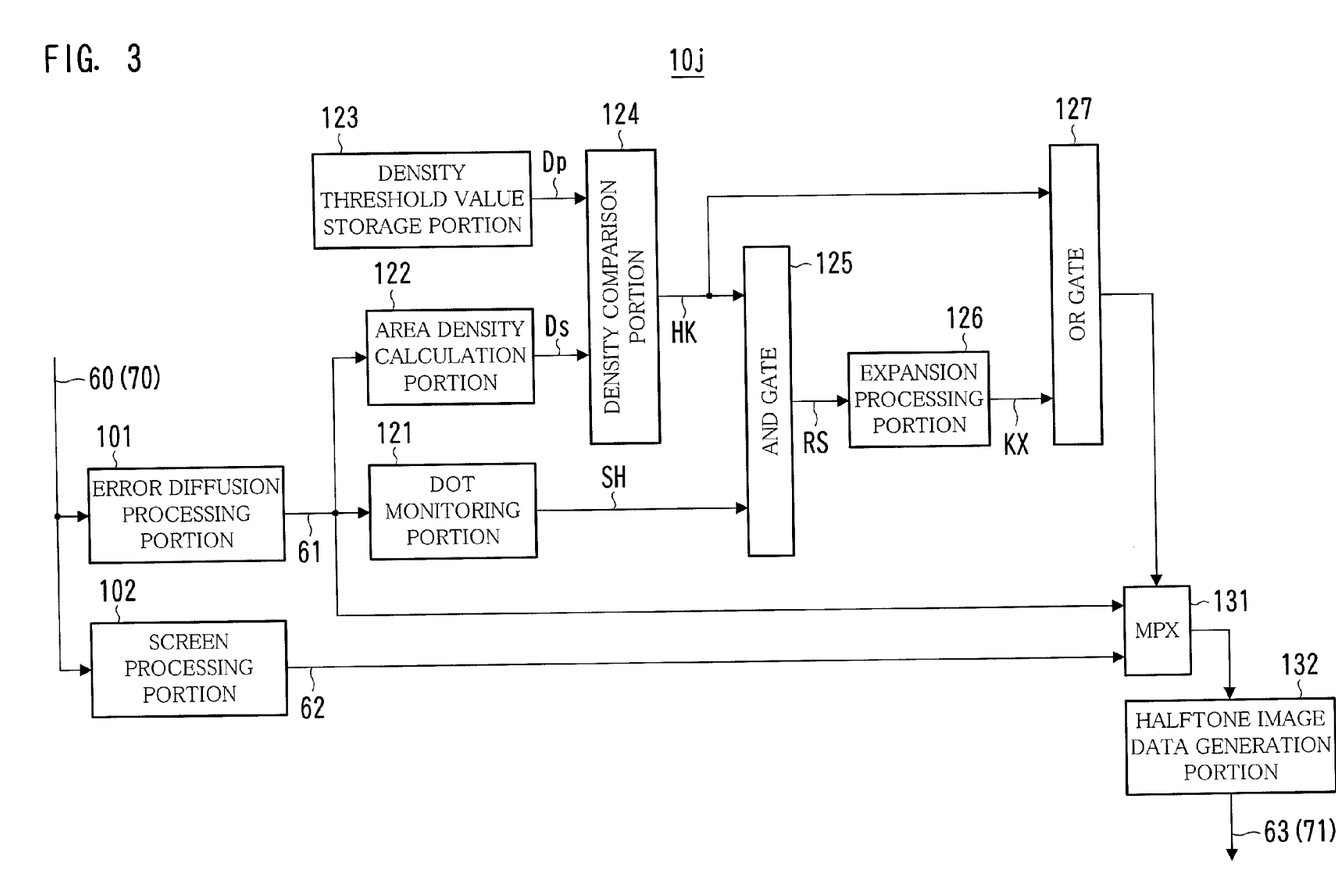
FIG. 3 shows an example configuration of an image processing circuit.

FIG. 1 shows an example configuration of a network system having an image forming device 1, FIG. 2 shows an example hardware configuration of the image forming device 1, and FIG. 3 shows an example configuration of an image processing circuit 10j.

The image forming device 1 is an image processing device typically called a multifunction peripheral (MFP) or the like, and consolidates functions such as copy, PC print (network printing), fax and scan.

The image forming device 1 can, as shown in FIG. 1, be connected to other devices such as a personal computer 2 or the like via a communication line 3.

Apart from the image processing circuit 10j, the image forming device 1 is, as shown in FIG. 2, constituted by a CPU (Central Processing Unit) 10a, a RAM (Random Access Memory) 10b, a ROM (Read Only Memory) 10c, a nonvolatile memory device 10d, an operation panel 10e, a NIC (Network Interface Card) 10f, a printing device 10g, a scanner 10h, a modem 10i and the like.

The scanner 10h is a device that generates image data by reading an image of an original constituted by a photograph, text, graphic, chart or the like from a sheet.

The image processing circuit 10j performs image processing using the image data of an image of an original read by the scanner 10h or image data transmitted from the personal computer 2 or the like. This will be discussed later.

The printing device log prints an image that has been image processed by the image processing circuit 10j onto a sheet.

The operation panel 10e is constituted by a touch panel, a group of keys and the like. The touch panel displays a screen for providing a message to a user, a screen showing processing results, a screen for the user to input an instruction to the image forming device 1, and the like. Also, the touch panel detects a position that has been touched, and notifies that position to the CPU 10a. The group of keys is constituted by keys such as numeric keys, a start key and a stop key. The user is able to issue commands and input data to the image forming device 1 by operating the operation panel 10e.

The NIC 10f communicates with other devices such as the personal computer 2 and the like using TCP/IP (Transmission Control Protocol/Internet Protocol) via a so-called LAN (Local Area Network) line or the like.

The modem 10i communicates with another fax terminal using the G3 protocol via a fixed telephone network.

The nonvolatile memory device 10d is a nonvolatile recording device. A hard disk, an SSD (Solid State Drive), a flash memory or the like is used as the nonvolatile memory device 10d.

Apart from an OS (Operating System), programs such as firmware and applications are stored in the ROM 10c or the nonvolatile memory device 10d. These programs are loaded into the RAM 10b and executed by the CPU 10a as necessary.

The image processing circuit 10j, as shown in FIG. 3, is constituted by an error diffusion processing portion 101, a screen processing portion 102, a dot monitoring portion 121, an area density calculation portion 122, a density threshold value storage portion 123, a density comparison portion 124, an AND gate 125, an expansion processing portion 126, an OR gate 127, an MPX (multiplexer) 131 and the like.

The portions of the image processing circuit 10j are realized by circuits such as an ASIC (Application Specific Integrated Circuit) or an FPGA (Field Programmable Gate Array). Alternatively, some or all of the functions of the image processing circuit 10j may be realized by causing the CPU 10a to execute a program. In this case, a program describing the procedures of various processing (discussed later) can be provided, and the CPU 10a can be caused to execute this program.

The image processing circuit 10j uses such a configuration to perform halftone processing on an image using both error diffusion processing and screen processing. Hereinafter, the processing content and the like of the portions of the image processing circuit 10j shown in FIG. 3 will be described, taking the case where halftone processing is performed on a given original image 60 as an example.

Figure 4:
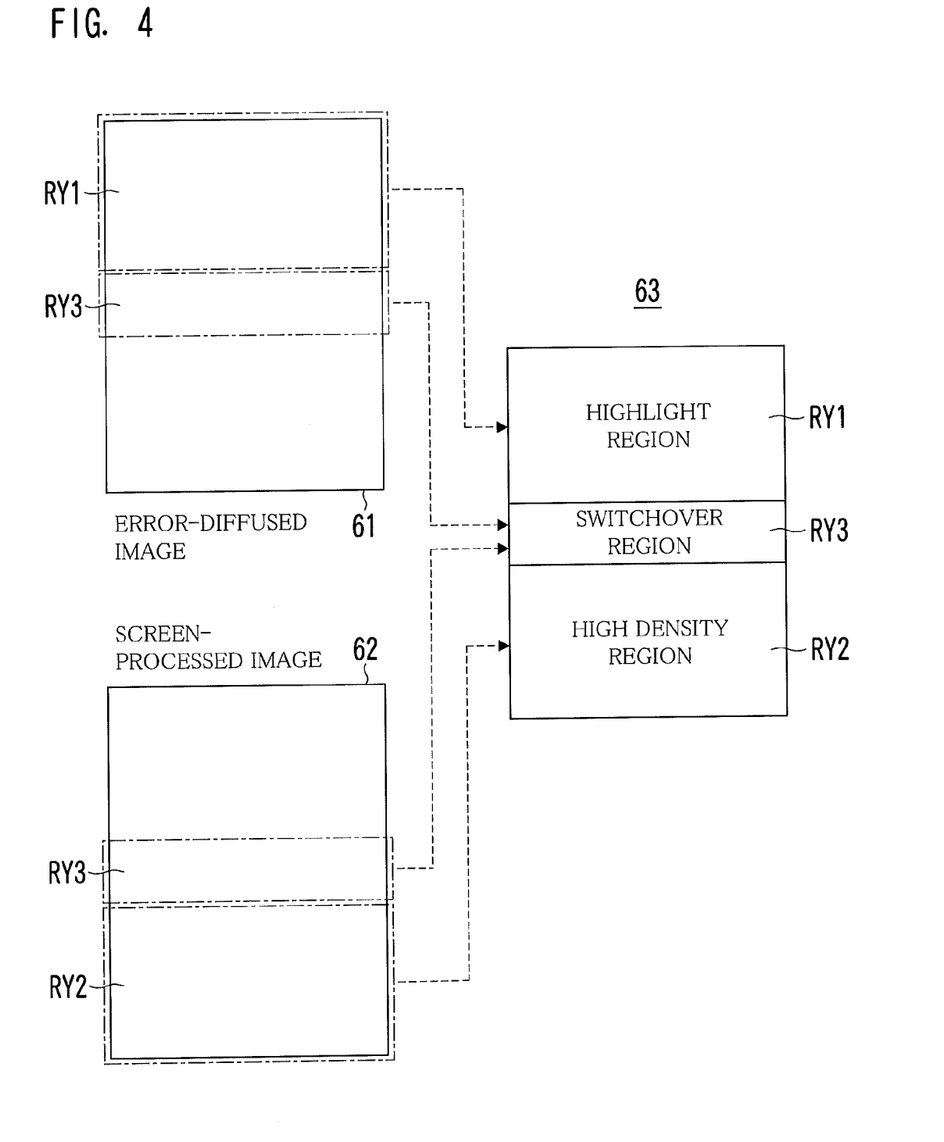
FIG. 4 shows an example outline of a method for generating a blended halftone image.
Figure 5:
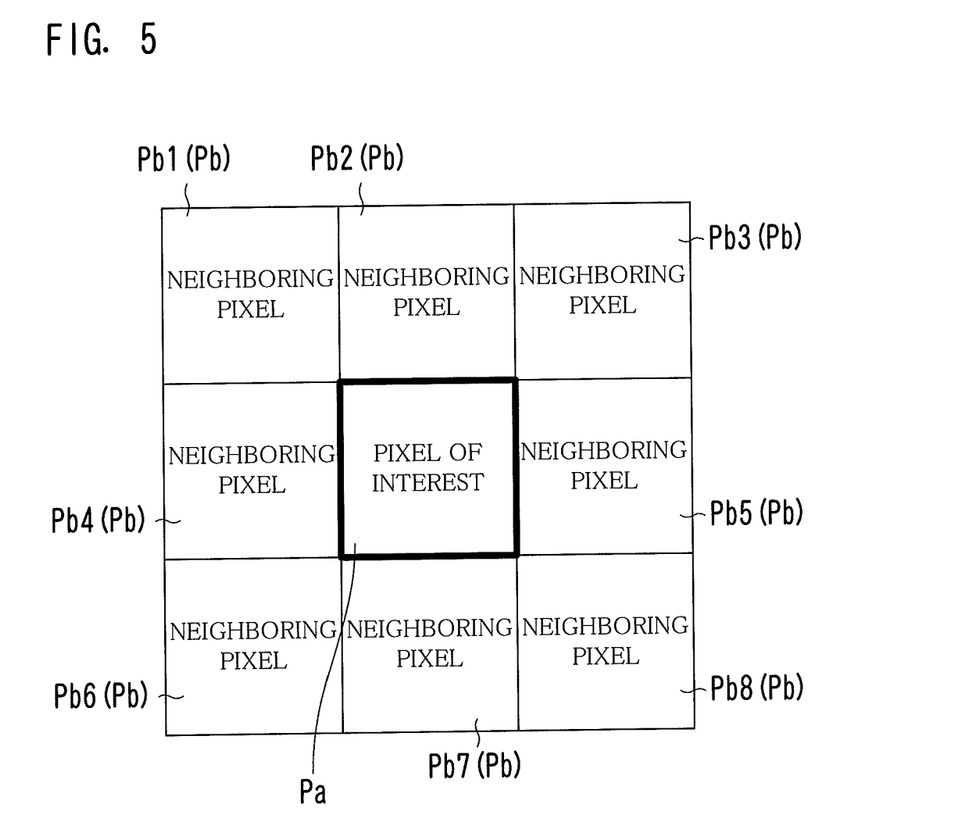
FIG. 5 shows an example positional relationship between a pixel of interest and neighboring pixels.
Figure 6:
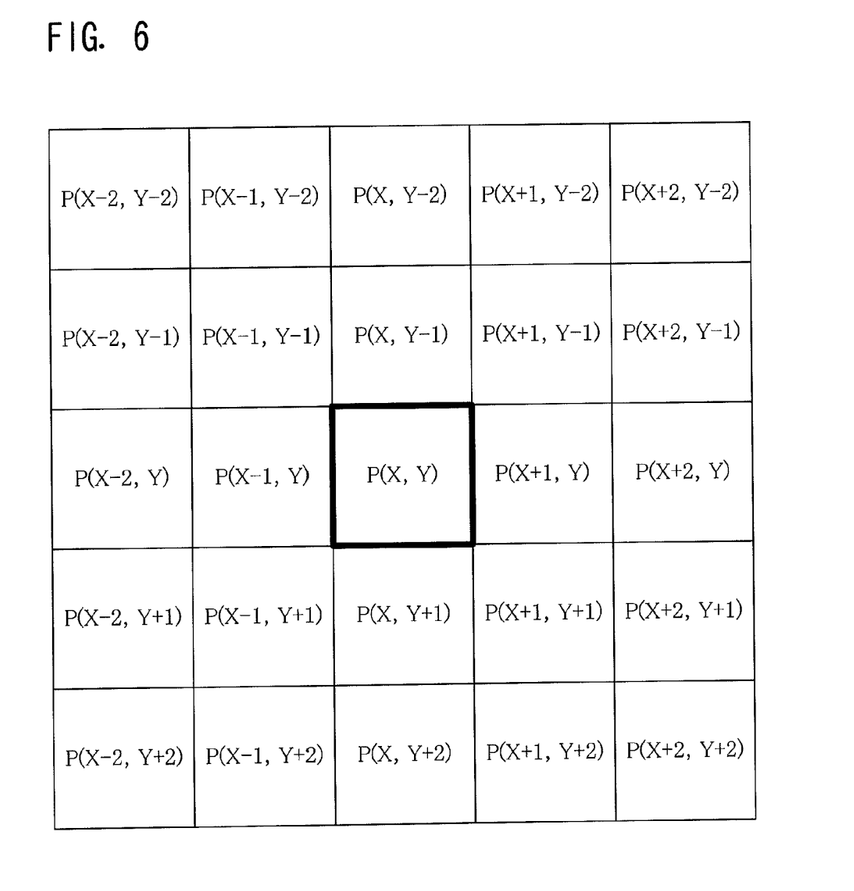
FIG. 6 is for describing a method for calculating area density.
Figure 7A:
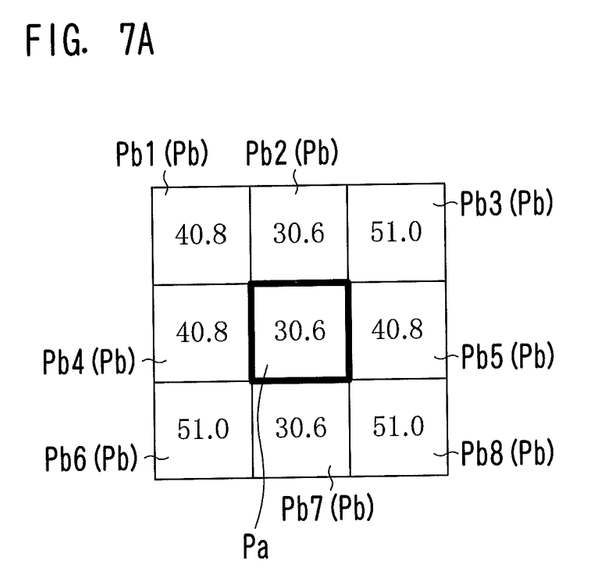
FIGS. 7A and 7B show example area densities and comparison results.
Figure 7B:
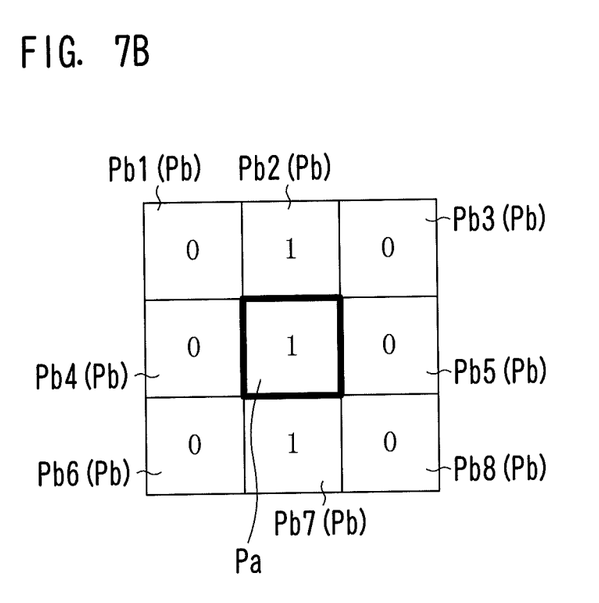
Figure 8:
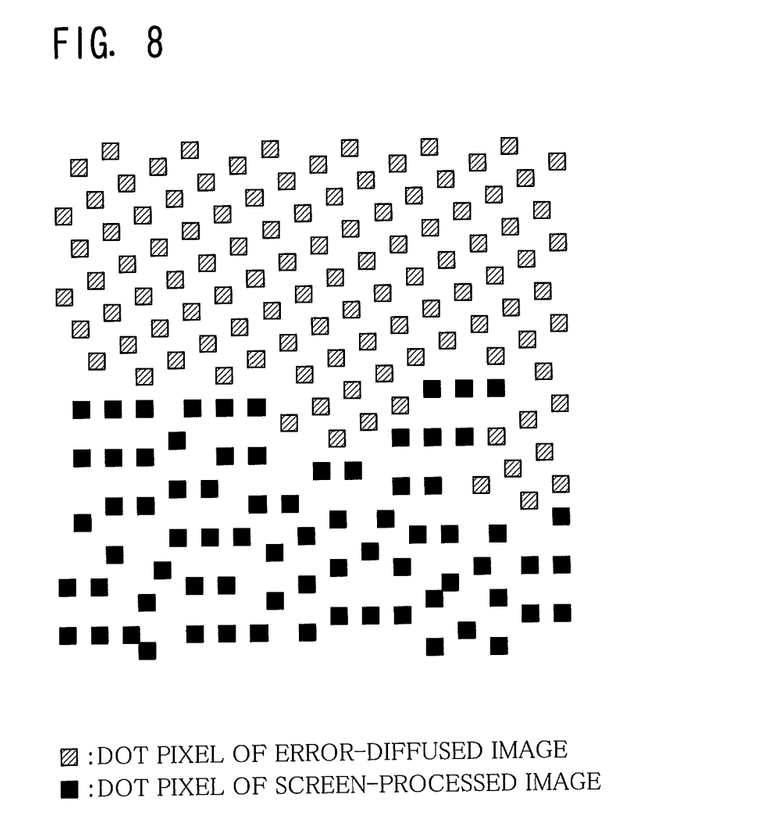
FIG. 8 shows an example portion of an image of a switchover region in a blended halftone image.
Figure 9:
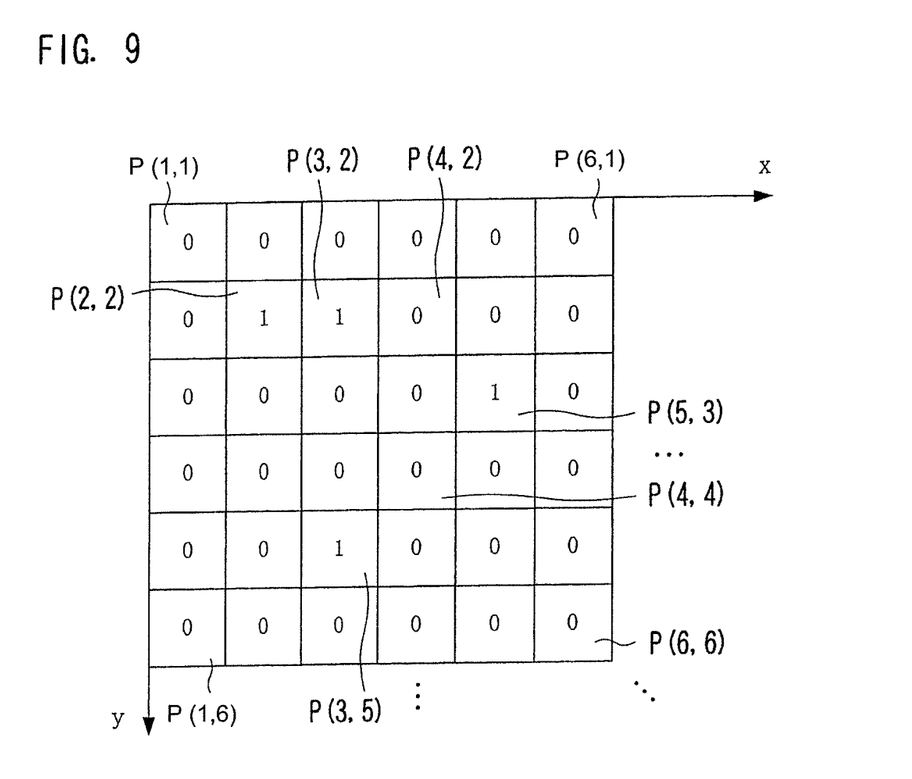
FIG. 9 shows an example portion of a switchover region in an error-diffused image.

FIG. 4 shows an example outline of a method for generating a blended halftone image 63, FIG. 5 shows an example positional relationship between a pixel of interest Pa and neighboring pixels Pb, FIG. 6 is for describing a method for calculating an area density Ds, FIGS. 7A and 7B show example area densities Ds and comparison result values HK, FIG. 8 shows an example portion of an image in a switchover region RY3 of the blended halftone image 63, and FIG. 9 shows an example portion of the switchover region RY3 of an error-diffused image 61.

The user sets a sheet carrying an original image 60 on a platen of the scanner 10h, and performs a prescribed operation on the operation panel 10e.

The scanner 10h then generates image data 70 by reading the original image 60 from the sheet set on the platen. The image data 70 is updated following image processing on the original image 60 by the portions of the image processing circuit 10j shown in FIG. 3.

The error diffusion processing portion 101 performs dithering (halftone processing) on the original image 60 using an error diffusion method. Hereinafter, the original image 60 dithered by the error diffusion processing portion 101 will be described as "error-diffused image 61".

The screen processing portion 102 dithers the original image 60 by performing screen processing. In other words, the screen processing portion 102 dithers the original image 60 using a screen composed of various shapes such as dots, lines, or mesh. Hereinafter, the original image 60 dithered by the screen processing portion 102 will be referred to as "screen-processed image 62".

The error-diffused image 61 and the screen-processed image 62 are used in order to generate a blended halftone image 63. At this time, the error-diffused image 61 and the screen-processed image 62 are selectively used depending on the attributes of regions in the original image 60 or the like. For example, the error-diffused image 61 is used for a region whose density gradation is low (highlight region). On the other hand, the screen-processed image 62 is used for a region whose density gradation is high.

However, when the error-diffused image 61 and the screen-processed image 62 are selectively used according to the gradation level, the proximity of the boundary between a highlight region and other regions appears unnatural, as was described in the Description of the Related Art.

In view of this, as shown in FIG. 4, the image forming device 1 uses the error-diffused image 61 for a region in which the density gradation is less than $\alpha$ (hereinafter, described as "highlight region RY1"), and uses the screen-processed image 62 for a region in which the density gradation is greater than or equal to $\beta$ (hereinafter, described as "high density region RY2"). Note that $\alpha<\beta$. And for a region whose gradation is greater than or equal to $\alpha$ and less than $\beta$ (hereinafter, described as "switchover region RY3"), the image forming device 1 uses the error-diffused image 61 and the screen-processed image 62 selectively per pixel.

The portions from the dot monitoring portion 121 to the MPX 131 execute halftone processing on the switchover region RY3, by blending the error-diffused image 61 and the screen-processed image 62.

The dot monitoring portion 121 monitors the switchover region RY3 in the error-diffused image 61, and detects pixels in which dots are disposed from the switchover region RY3. Hereinafter, a given detected pixel will be described as a "pixel of interest Pa". The eight pixels neighboring the pixel of interest Pa, such as shown in FIG. 5, will be described as neighboring pixels Pb. Also, the neighboring pixels Pb may be described separately as "neighboring pixel Pb1" to "neighboring pixel Pb8".

Further, the dot monitoring portion 121 checks whether the pixel of interest Pa is an isolated point pixel. An "isolated point pixel" is a pixel with respect to which dots are not disposed in any of the neighboring pixels. Therefore, the dot monitoring portion 121 checks whether dots are disposed in the neighboring pixels Pb1 to Pb8. The dot monitoring portion 121 discriminates the pixel of interest Pa as being an isolated point pixel if no dots whatsoever are disposed in the neighboring pixels Pb, and discriminates the pixel of interest Pa as not being an isolated point pixel if even one dot is disposed in the neighboring pixels Pb.

The dot monitoring portion 121 then outputs "1" as an isolated point discrimination result value SH if the pixel of interest Pa is discriminated as being an isolated point pixel, and outputs "0" as the isolated point discrimination result value SH if the pixel of interest Pa is discriminated as not being an isolated point pixel.

The area density calculation portion 122 calculates an area density Ds for each of the pixel of interest Pa and the neighboring pixels Pb. The "area density Ds" is the density of a prescribed range centered on that pixel.

For example, in the case of calculating the area density Ds of a given pixel P(X,Y) with the prescribed range being a rectangular area of 5×5 pixels, the area density calculation portion 122 calculates the average density of 5×5 pixels centered on a pixel P(X,Y) such as shown in FIG. 6. If, in this case, the density is represented by 8-bit values (i.e., 256 gradations), and dots are disposed in seven of the 25 pixels, the area density calculation portion 122 calculates the area density Ds of the pixel P(X,Y) by performing the operation Ds=255×7/25=71.4.

The area densities Ds of the pixel of interest Pa and the neighboring pixels Pb are output to the density comparison portion 124.

The density comparison portion 124 compares the area density Ds of each of the pixel of interest Pa and the neighboring pixels Pb1 to Pb8 with a density threshold value Dp. The density comparison portion 124 then outputs "1" as the comparison result value HK for pixels whose area density Ds is less than the density threshold value Dp, and outputs "0" as the comparison result value HK for pixels for which this is not the case. Note that the density threshold value Dp is prestored in the density threshold value storage portion 123.

For example, in the case where the respective area densities Ds for the pixel of interest Pa and the neighboring pixels Pb1 to Pb8 are as shown in FIG. 7A, and the density threshold value Dp is "35", values such as shown in FIG. 7B are obtained as the comparison result values HK of the pixels.

The respective comparison result values HK of the pixel of interest Pa and the neighboring pixels Pb1 to Pb8 are all output to the OR gate 127. On the other hand, only the comparison result value HK of the pixel of interest Pa is output to the AND gate 125.

The AND gate 125 calculates a logical AND RS of the isolated point discrimination result value SH output from the dot monitoring portion 121 and the comparison result value HK output from the density comparison portion 124.

In the case where a dot is disposed in the pixel of interest Pa and the area density Ds of the pixel of interest Pa is less than the density threshold value Dp, the logical AND RS will be "1". If this is not the case, the logical AND RS will be "0". The logical AND RS is output to the expansion processing portion 126.

The expansion processing portion 126 expands the logical AND RS output from the AND gate 125 into a 3×3 matrix KX. In other words, the expansion processing portion 126 expands the logical AND RS output from the AND gate 125 into a matrix KX in which all of the 3×3 elements are "1" if the logical AND RS is "1", and expands the logical AND RS output from the AND gate 125 into a matrix KX in which all of the 3×3 elements are "0" if the logical AND RS is "0".

The element in the center of the matrix KX corresponds to the pixel of interest Pa, and the other elements correspond to the neighboring pixels Pb whose positional relationship with the pixel of interest Pa is the same. For example, the upper left element corresponds to the neighboring pixel Pb1. Similarly, the lower right element corresponds to the neighboring pixel Pb8. The matrix KX is output to the OR gate 127.

The OR gate 127 calculates the logical OR of the comparison result value HK of each of the pixel of interest Pa and the neighboring pixels Pb1 to Pb8 output from the density comparison portion 124 and the value of the element corresponding to each pixel shown in the matrix KX output from the expansion processing portion 126, as per the following equation (1).

$$\begin{pmatrix} Rwb1 & Rwb2 & Rwb3 \\ Rwb4 & Rwa & Rwb5 \\ Rwb6 & Rwb7 & Rwb8 \end{pmatrix} = \begin{pmatrix} HKb1 & HKb2 & HKb3 \\ HKb4 & HKa & HKb5 \\ HKb6 & HKb7 & HKb8 \end{pmatrix} + \begin{pmatrix} Yb1 & Yb2 & Yb3 \\ Yb4 & Ya & Yb5 \\ Yb6 & Yb7 & Yb8 \end{pmatrix} \quad (1)$$

Note that HKa is the comparison result value HK of the pixel of interest Pa. HKb1 to HKb8 are respectively the comparison result values HK of the neighboring pixels Pb1 to Pb8. Ya is the element, shown in the matrix KX, corresponding to the pixel of interest Pa. Yb1 to Yb8 are respectively the elements, shown in the matrix KX, corresponding to the neighboring pixels Pb1 to Pb8. RWa is the logical AND for the pixel of interest Pa. RWb1 to RWb8 are respectively the logical ANDs for the neighboring pixels Pb1 to Pb8.

According to Equation (1), if the pixel of interest Pa is an isolated point pixel, and if the calculated area density of the pixel of interest Pa is less than the density threshold value Dp, the logical ORs RWa and RWb1 to RWb8 will all be "1", irrespective of the results of the comparisons by the density comparison portion 124, that is, the comparison result values HK. On the other hand, if the pixel of interest Pa is not an isolated point pixel, the logical ORs RWa and RWb1 to RWb8 will equal the respective comparison result values HK of the pixel of interest Pa and the neighboring pixels Pb1 to Pb8.

The MPX 131 selects the binary value of each pixel in the switchover region RY3 of the blended halftone image 63 from pixels in the error-diffused image 61 or from pixels in the screen-processed image 62 in the following manner.

The MPX 131 selects the binary values of the pixel of interest Pa and the neighboring pixels Pb in the following manner. For a pixel whose logical OR RW is "1", the MPX 131 selects the binary value of that pixel in the error-diffused image 61.

In other words, if the logical OR RWa is "1", the MPX 131 selects the binary value of the pixel of interest Pa, as the binary value of the pixel in the blended halftone image 63 that is in the same position as the pixel of interest Pa. Similarly, if the logical OR RWbi (where i=1, 2, . . . , 8) is "1", the MPX 131 selects the binary value of the neighboring pixel Pbi, as the binary value of the pixel in the blended halftone image 63 that is in the same position as the neighboring pixel Pbi.

On the other hand, if the logical OR RW is "0", the MPX 131 selects the binary value of the pixel in the screen-processed image 62 that is in the same position as that pixel.

In other words, if the logical OR RWa is "0", the MPX 131 retrieves the pixel in the screen-processed image 62 that is in the same position as the pixel of interest Pa, and selects the binary value of the retrieved pixel as the binary value of the pixel in the blended halftone image 63 that is the same position as the pixel of interest Pa. Similarly, if the logical OR RWbi is "0", the MPX 131 retrieves the pixel in the screen-processed image 62 that is in the same position as the neighboring pixel Pbi, and selects the binary value of the retrieved pixel as the binary value of the pixel in the blended halftone image 63 that is the same position as the neighboring interest Pbi.

The binary values (indicating the presence or absence of dots) of the pixels in the blended halftone image 63 that are in the same position as the pixel of interest Pa and the neighboring pixels Pb1 to Pb8 are thus determined.

The dot monitoring portion 121 monitors the presence or absence of dots and detects a pixel in which a dot is disposed as a pixel of interest Pa similarly for the remaining pixels in the switchover region RY3 of the error-diffused image 61. The portions from the area density calculation portion 122 to the MPX 131 then perform the abovementioned processing on the newly detected pixel of interest Pa and the eight pixels Pb neighboring the pixel of interest Pa. The binary value of the pixel in the blended halftone image 63 that is in the same position as each of the pixel of interest Pa and the neighboring pixels Pb is then selected from one of the error-diffused image 61 and the screen-processed image 62.

As a result of the above processing, the binary value of the pixel in the blended halftone image 63 that is in the same position as each of the pixels (i.e., pixels of interest Pa) in which a dot appears in the switchover region RY3 of the error-diffused image 61 and the eight pixels neighboring thereto (neighboring pixels Pb) is determined. For the remaining pixels in the switchover region RY3 of the blended halftone image 63, the MPX 131 selects the binary value of pixels in the screen-processed image 62 that are in the same position as those remaining pixels.

That is, the MPX 131 can, with regard to the switchover region RY3, be said to blend the error-diffused image 61 and the screen-processed image 62 in the manner described in (a) and (b) below.

(a) The MPX 131 bases the blended halftone image 63 on the group of pixels in the switchover region RY3 of the screen-processed image 62.
(b) With regard to pixels whose logical OR RW is determined to be "1" by the OR gate 127 (hereinafter, described as "replacement target pixels"), the MPX 131 erases the binary values of pixels in the base group of pixels that are in the same position as the replacement target pixels, and substitutes the binary values of pixels in the error-diffused image 61 that are in the same position as the replacement target pixels.
(c) With regard to pixels whose logical OR RW is determined to be "0" by the OR gate 127, the MPX 131 selects the corresponding pixel of the screen-processed image 62.

The above method enables an unnatural connection of the dots such as illustrated in FIG. 10 to be corrected as shown in FIG. 8.

Further, the MPX 131 selects, as the binary value of pixels in the highlight region RY1 of the blended halftone image 63, the binary values of the pixels in the error-diffused image 61 that are in the same position. Similarly, the MPX 131 selects, as the binary values of pixels in the high density region RY2 of the blended halftone image 63, the binary values of the pixels in the screen-processed image 62 that are in the same position.

The binary values (indicating the presence or absence of dots) of pixels in the highlight region RY1, the high density region RY2 and the switchover region RY3 are thus selected. The binary values of the pixels are then output to a halftone image data generation portion 132.

The halftone image data generation portion 132 generates halftone image data 71 indicating the binary values of the pixels selected by the MPX 131.

The halftone image data 71 is output to the printing device 10g. The blended halftone image 63 is then printed onto a sheet by the printing device 10g. Alternatively, the halftone image data 71 is transmitted to the personal computer 2 or the like by the NIC 10f.

Note that according to the above example, any one pixel may constitute a pixel of interest Pa or a neighboring pixel Pb a plurality of times.

For example, the pixel P(2,2) shown in FIG. 9 is treated as a pixel of interest Pa because of having a dot disposed therein, and is further treated as a neighboring pixel Pb when the pixel P(3,2) is the pixel of interest Pa. The pixel P(4,2) is treated as a neighboring pixel Pb when the pixel P(3,2), which is not an isolated point pixel, is the pixel of interest Pa, and is further treated as a neighboring pixel Pb when the pixel P(5,3), which is an isolated point pixel, is the pixel of interest Pa. The pixel P(3,2) is treated as a pixel of interest Pa because of having a dot disposed therein, and is further treated as a neighboring pixel Pb when the pixel P(2,2), which is not an isolated point pixel, is the pixel of interest Pa. The pixel P(4,4) is treated as a neighboring pixel Pb when the pixel P(3,5) and the pixel P(5,3), which are isolated point pixels, are respectively the pixel of interest Pa.

The binary value of a pixel that thus constitutes a pixel of interest Pa or a neighboring pixel Pb a plurality of times is selected more than once by the MPX 131. In such a case, the MPX 131 can determine the binary value of the pixel in the blended halftone image 63 that is the same position as that pixel in the following manner, for example, and output the determined binary value to the halftone image data generation portion 132.

If even one of the plurality of selection results is "0", the MPX 131 determines and outputs the binary value as "0". If all of the plurality of selection results are "1", the MPX 131 determines and outputs the binary value as "1". Alternatively, the MPX 131 may determine and output whichever of "0" or "1" occurs the most as the binary value.

The present embodiment enables an unnatural connection between dots near the boundary between a region that has undergone error diffusion processing and a region that has undergone screen processing, that is, between dots in a switchover region RY3, to be reduced to a greater extent than has been possible to date.

In the present embodiment, an error-diffused image and a screen processed image are blended, but the present invention can also be applied to the case where halftone images generated by processing other than error diffusion processing or screen processing are blended.

The thresholds α and β can be arbitrarily set. If, in the case of 256 gradations, the threshold α is set to "0" and the threshold β is set to "255", the blended halftone image 63 can be generated by performing processing to blend the error-diffused image 61 and the screen-processed image 62 with respect to the entire area of the original image 60.

Otherwise, the configuration, processing content, processing procedures, data structure and the like of all or individual portions of the image forming device 1 can be appropriately modified in keeping with the spirit of the invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A halftone image generation device that, by partially selecting and blending a first halftone image obtained by halftone processing a specific image using a first method and a second halftone image obtained by halftone processing the specific image using a second method that differs from the first method, generates a third halftone image of the specific image, comprising:
   a detector configured to detect from the first halftone image, a pixel of interest in which a dot is disposed; and
   a blender configured to blend the first halftone image and the second halftone image by, in a case where dots are not disposed in neighboring pixels of the pixel of interest in the first halftone image, employing, as binary values of isolated-point related pixels in the third halftone image that are in a same position as the pixel of interest and the neighboring pixels, binary values of the pixel of interest in the first halftone image and the neighboring pixels in the first halftone image.

2. The halftone image generation device according to claim 1, comprising
   a calculator configured to calculate a density of a prescribed range centered on the pixel of interest and the neighboring pixels,
   wherein the blender is configured to blend the first halftone image and the second halftone image by, in a case where a neighboring dot is disposed in one or more of the neighboring pixels of the pixel of interest in the first halftone image, employing, as binary values of highlight related pixels corresponding to a position of highlight pixels, which are pixels among the pixel of interest and the neighboring pixels whose density of the prescribed range is less than a prescribed value, binary values of the highlight pixels.

3. The halftone image generation device according to claim 2,
   wherein the blender is configured to blend the first halftone image and the second halftone image by employing, as binary values of pixels in the third halftone image that are not one of the isolated-point related pixels or one of the highlight related pixels, binary values of pixels in the second halftone image that are in a same position as said isolated-point related pixels or said highlight related pixels.

4. The halftone image generation device according to claim 1,
   wherein the first method is a method using error diffusion processing, and
   the second method is a method using screen processing.

5. A halftone image generation method configured to be executed by an image forming device that, by partially selecting and blending a first halftone image obtained by halftone processing a specific image using a first method and a second halftone image obtained by halftone processing the specific image using a second method that differs from the first method, generates a third halftone image of the specific image, the method comprising:
   detecting from the first halftone image, a pixel of interest in which a dot is disposed; and
   blending the first halftone image and the second halftone image by, in a case where dots are not disposed in neighboring pixels of the pixel of interest in the first halftone image, employing, as binary values of isolated-point related pixels in the third halftone image that are in a same position as the pixel of interest and the neighboring pixels, binary values of the pixel of interest in the first halftone image and the neighboring pixels in the first halftone image.

6. The halftone image generation method according to claim 5, comprising
   calculating a density of a prescribed range centered on the pixel of interest and the neighboring pixels,
   blending the first halftone image and the second halftone image by, in a case where a neighboring dot is disposed in one or more of the neighboring pixels of the pixel of interest in the first halftone image, employing, as binary values of highlight related pixels corresponding to a position of highlight pixels, which are pixels among the pixel of interest and the neighboring pixels whose density of the prescribed range is less than a prescribed value, binary values of the highlight pixels.

7. The halftone image generation method according to claim 6,
   wherein the blending process includes blending the first halftone image and the second halftone image by employing, as binary values of pixels in the third halftone image that are not one of the isolated-point related pixels or one of the highlight related pixels, binary values of pixels in the second halftone image that are in a same position as said isolated-point related pixels or said highlight related pixels.

8. The halftone image generation method according to claim 5,
   wherein the first method is a method using error diffusion processing, and
   the second method is a method using screen processing.

9. A non-transitory computer-readable storage medium storing thereon a computer program used in a computer configured to, by partially selecting and blending a first halftone image obtained by halftone processing a specific image using a first method and a second halftone image obtained by halftone processing the specific image using a second method that differs from the first method, generate a third halftone image of the specific image, the computer program causing the computer to perform:
   a detection process configured to detect, from the first halftone image, a pixel of interest in which a dot is disposed; and
   a blending process configured to blend the first halftone image and the second halftone image by, in a case where dots are not disposed in neighboring pixels of the pixel of interest in the first halftone image, employing, as binary values of isolated-point related pixels in the third halftone image that are in a same position as the pixel of interest and the neighboring pixels, binary values of the pixel of interest in the first halftone image and the neighboring pixels in the first halftone image.

10. The non-transitory computer-readable storage medium according to claim 9, the program causing the computer to further perform a calculating process for calculating a density of a prescribed range centered on the pixel of interest and the neighboring pixels,
   wherein the blending process includes blending the first halftone image and the second halftone image by, in a case where a neighboring dot is disposed in one or more of the neighboring pixels of the pixel of interest in the first halftone image, employing, as binary values of highlight related pixels corresponding to a position of highlight pixels, which are pixels among the pixel of interest and the neighboring pixels whose density of the prescribed range is less than a prescribed value, binary values of the highlight pixels.

11. The non-transitory computer-readable storage medium according to claim 10, wherein the blending process includes blending the first halftone image and the second halftone image by employing, as binary values of pixels in the third halftone image that are not one of the isolated-point related pixels or one of the highlight related pixels, binary values of pixels in the second halftone image that are in a same position as said isolated-point related pixels or said highlight related pixels.

12. The non-transitory computer-readable storage medium according to claim 9,
   wherein the first method is a method using error diffusion processing, and
   the second method is a method using screen processing.

* * * * *